Aug. 25, 1936.  M. B. DE JARNETTE  2,052,452
MEASURING DEVICE
Filed Oct. 23, 1935
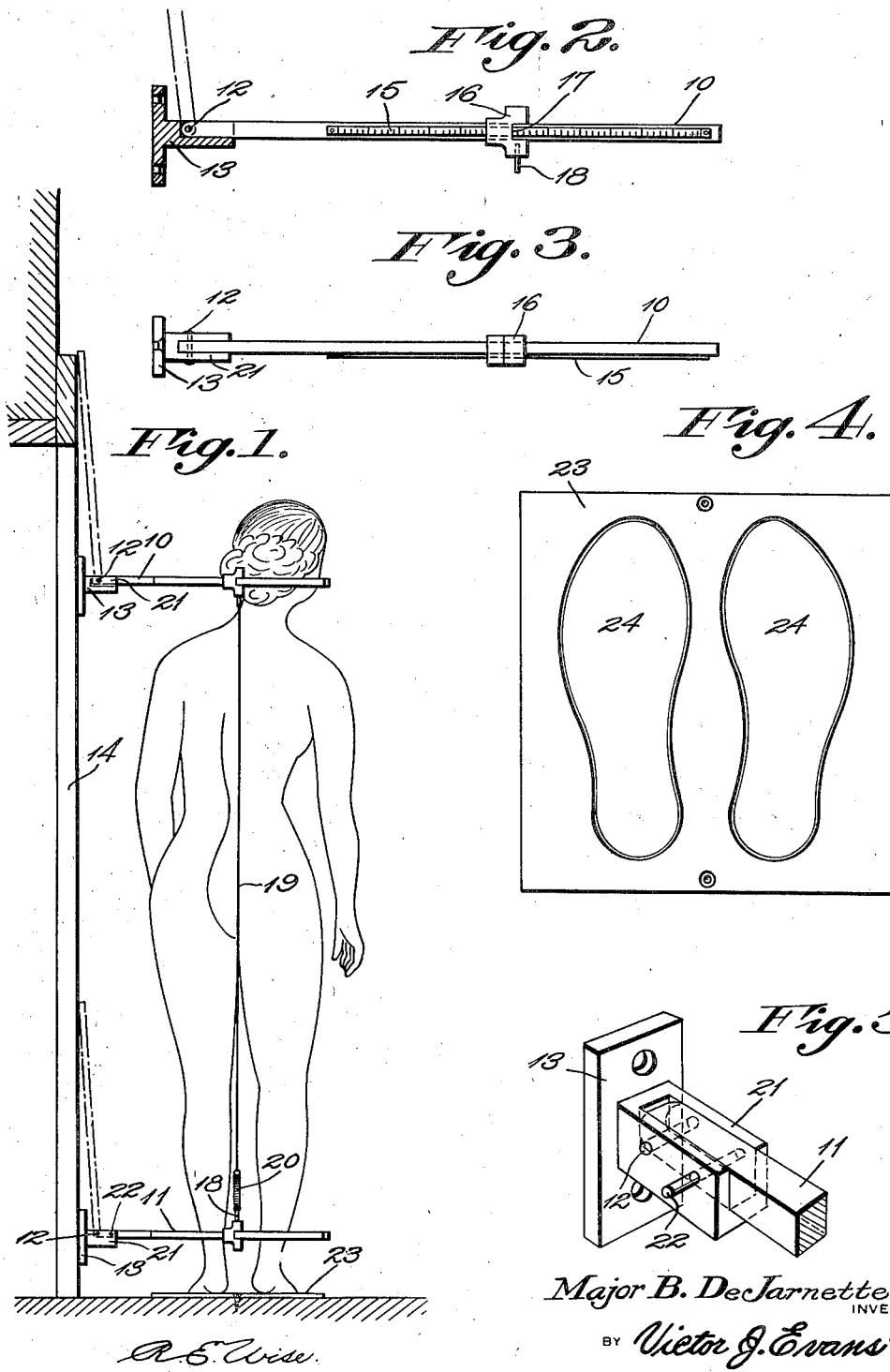
Major B. DeJarnette
INVENTOR Patented Aug. 25, 1936

2,052,452

UNITED STATES PATENT OFFICE 2,052,452

MEASURING DEVICE

Major B. De Jarnette, Nebraska City, Nebr.

Application October 23, 1935, Serial No. 46,393

2 Claims. (Cl. 33—174)

The invention relates to a measuring device and more especially to a spinal analysis instrument.

The primary object of the invention is the provision of a device or appliance of this character, wherein through the use of a plumb cord connected between scale arms the spinal column and pelvis can be measured to identify the balance of the body of a human being for accurately determining a curvature of the spinal column as well as the lower limbs of a person.

Another object of the invention is the provision of a device or appliance of this character, wherein the meter arms are readily foldable to be out of the way when not in use and when in use it is possible to accurately determine certain spinal vertebra displacements to gain true knowledge of defects from normalcy to abnormalcy and thus enabling treatment to a patient for correction thereof, the device or appliance being useful whereby muscular osseous imbalances may be accurately measured and also whereby a method may be employed to test the mobility of the pelvis girdle and spinal irregularities.

A further object of the invention is the provision of a device or appliance of this character, which is simple in construction, thoroughly reliable and effective in operation, readily and easily handled, susceptible of attachment to a vertical support, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is an elevation of the device or appliance constructed in accordance with the invention shown by full lines in position for measurement of the spinal column while by dotted lines the said device or appliance is shown folded.

Figure 2 is a side elevation of one of the meter arms, its bracket being in vertical section.

Figure 3 is a top plan view thereof.

Figure 4 is a plan view of a foot plate employed with the device or appliance.

Figure 5 is a fragmentary perspective view of one of the meter arms and its bracket.

Similar reference characters indicate corresponding parts throughout the several views in the drawing.

Referring to the drawing in detail, the device or appliance comprises a pair of metering arms 10 and 11, respectively, these being swingingly supported by pivots 12 in brackets 13 which are adapted to be fastened in any suitable manner in spaced relation to each other to a support vertically located, such as a door frame 14, and such brackets in their spaced relation are perpendicularly disposed so that the arms 10 and 11 swing in a vertical direction. On one exposed side face of each arm 10 and 11 is a suitable scale 15 calibrated for the purposes intended of the device or appliance and upon these arms 10 and 11 are movably supported slides 16, these having indicator points 17 cooperative with the scale 15 on said arm.

The slides 16 carry attaching members 18, one having connected thereto the end of a plumb cord or string 19 while the other has connected thereto a coiled tensioning spring 20 which is joined with the other terminal of the cord 19 so that the latter is maintained under tension and in a straight condition relieved of wavy formation when the arms 10 and 11 are swung to horizontal position in their spaced relation to each other and in this position of such arms the said cord 19 is ready for service in measuring the spinal column and the pelvis as well as the lower limbs or legs of a human being, this being shown in Figure 1 of the drawing.

The brackets 13 are formed with bifurcated lugs or bearings 21 into which are accommodated the pivoted ends of the arms 10 and 11 and the bifurcated lug or bearing for the arm 11 has removably fitted therein retaining keys or pins 22 which are engageable with the arms 10 and 11 when the same are in a horizontal position so that such arms will be held fast in this position. The horizontal position of the arms 10 and 11 is the service position for the device or appliance.

Adapted to be fastened to a floor or foundation is a foot plate 23 having depressed therein foot seats 24 and this plate when fastened to the foundation or floor is adapted to be located to have a person stand thereon with the feet of such person occupying the seats 24 so that the body of such person will align from the sacral apex with the cord 19 and in this manner the greatest body distortion can be measured by a user of the device or appliance and the body balance determined from normalcy to abnormalcy. The movable plumb cord 19 allows measurements to be made that enables an operator to determine whether a sacrum is plumb or abnormally positioned and thus through a method of treatment corrections can be made to a patient. The center of the foot plate 23 must be in alignment with the plumb string or cord 19 so that the patient will be at all times centered with respect to said string or cord 19 and deviation will be disclosed by the metering arms 10 and 11 through the scales 15 and the indicators 17 coacting therewith.

This is an instrument primarily intended for use by chiropractors, osteopaths and others who wish to determine relative positions of vertebral segments, sacrum and innominate structure as well as position of the lower limbs, shoulder girdle and shoulders proper and additionally the relative positions of the lobes of the ears.

Chiropractors, osteopaths and others operate upon the theory that the spinal segments in a person that is normal are perfectly aligned one to the other and in this instance it is found that the center of the sacrum, as well as the exact center of the occipital bone aligns with the centers of the vertebra. In this condition of alignment and health it is found that both superior iliac surfaces are level one to the other and that the lobes of the ear are equal distances from the superior surfaces of the shoulder.

Such operative believing that a normal alignment of the above-mentioned structures is essential to health recognizes the fact that in conditions of malalignments that the superior surfaces of the innominates will not be level, and that the lobe of one ear will be higher than that of the other. It is also found that in conditions of malalignment a perpendicular line drawn from the center of occiput through the spinal column and center of the sacrum will not fall vertical to both lower limbs but will cut closer to one knee than to the other. It is also recognized that all of the important muscles of the body used in standing upright and in locomotion arise or insert into the pelvic girdle, and that if and when the pelvic girdle is distorted the above-mentioned defects in structure occur.

In structural distortion the pelvic girdle must first be aligned before any of the superior or inferior structures can seek a normal alignment. Further, it is recognized that the sacrum is truly the foundation of the human's structural system and is supported between the two innominates, the said sacrum being a wedge-shaped bone with its broad surface superior and its point inferior to add strength to its innominate articulations and in view of these demonstrable factors the first therapeutic objective is a normal repositioning of the sacrum between the two innominates.

Demonstrating these theories as absolute clinical facts and having these facts again and again proven true, the instrument as above described has been created to enable an operative employing the above theories to accurately determine when a malalignment of the aforesaid structures occur and where they occur.

The use of the horizontal arms upon which are scales each having an exact zero at its center and extending by inches and fractions thereof for approximately six inches on each side of zero enables the operative using the instrument to determine if the structures are normal or if malaligned and also ascertains the left and right factors thereof, that is to say, a left or right hand malalignment and the extent thereof.

The instrument when in use enables one to judge accurately between the lower and upper ends of the human structural framework for malalignment.

The horizontal arms effect a sliding carriage to which is attached through eyelets a plumb line having on its lower end a coiled spring to provide a means whereby the string may be properly tensioned at all times.

The sliding carriage equipped with eyelets and a string enables an operative using the instrument to slide each carriage separately so as to position the string against the greatest lateral area of the spinal segments, center of the sacrum or the center of the occipital bone and thus determine accurately the distance in inches and fractions thereof the amount of misplacement that has taken place in the structures under measurement.

The arrangement of the parts of the instrument enables the folding thereof when not in use and its storage within the least possible space and thus affording greater room in the treating and examining rooms of an operative.

The foot plate associated with the instrument is such that a patient standing in this plate has the toes one inch closer together than are the heels of the feet of such patient thus giving a toeing in position. A patient standing on this foot plate assumes a posture that prevents the patient resisting normal movements whereby the body would tend to compensate for definite faults in structure. This foot plate assures an identical stand each time an examination is made and thus an operative using the equipment can accurately make measurements of the spinal vertebra, occiput bone and sacral centers.

What is claimed is:

1. An appliance of the character described comprising a pair of spaced vertically swinging meter arms, a vertical support for said arms, slides fitting said arms, a plumb cord connected with said slides, means for swingingly supporting the metering arms, means for fastening the metering arms in a horizontal servicing position, means for tensioning the cord when the said arms are in horizontal position to maintain said cord straight, and a foot plate having foot rests for coaction with said cord.

2. An appliance of the character described comprising a pair of vertically supported spaced vertically swinging meter arms, slides fitting said arms, a plumb cord connected with said slides, means for swingingly supporting the metering arms, means for fastening the metering arms in a horizontal servicing position, means for tensioning the cord when the said arms are in horizontal position to maintain said cord straight, a foot plate having foot rests for coaction with said cord, scales carried by said arms and indicators on the slides coacting with said scales.

MAJOR B. DE JARNETTE.